Jan. 1, 1929.  
W. A. KEMP  
1,697,429  
SHUTTER MECHANISM FOR MOTION PICTURE MACHINES  
Filed June 3, 1926  4 Sheets-Sheet 1
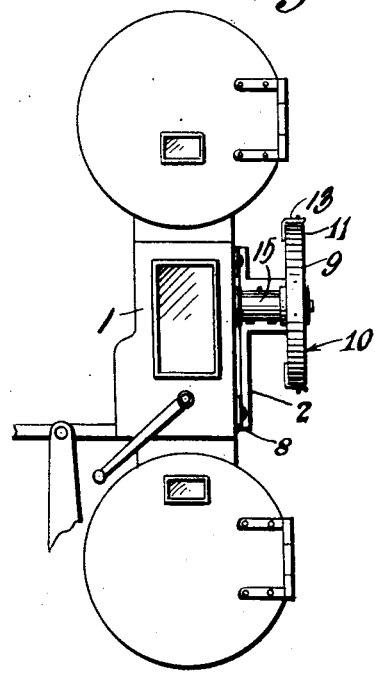
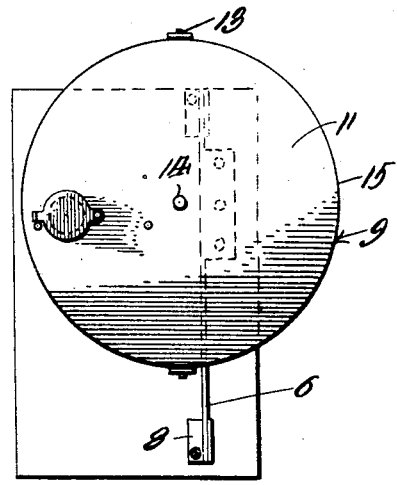
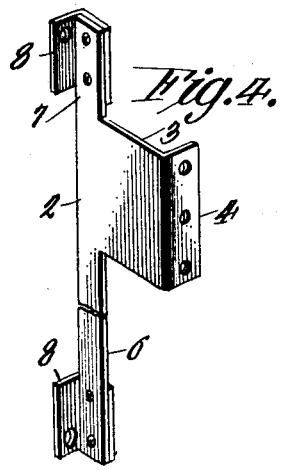
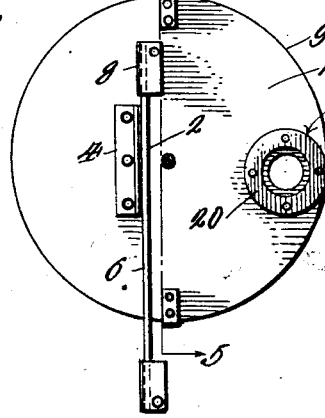
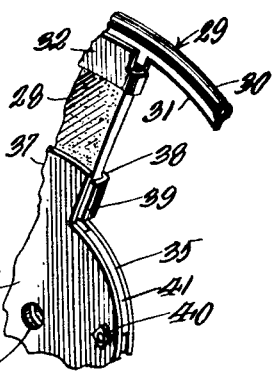
WITNESSES
WILLIAM A. KEMP Inventor
By Richard B. Owen  
Attorney Jan. 1, 1929. 1,697,429
W. A. KEMP
SHUTTER MECHANISM FOR MOTION PICTURE MACHINES
Filed June 3, 1926 4 Sheets-Sheet 2
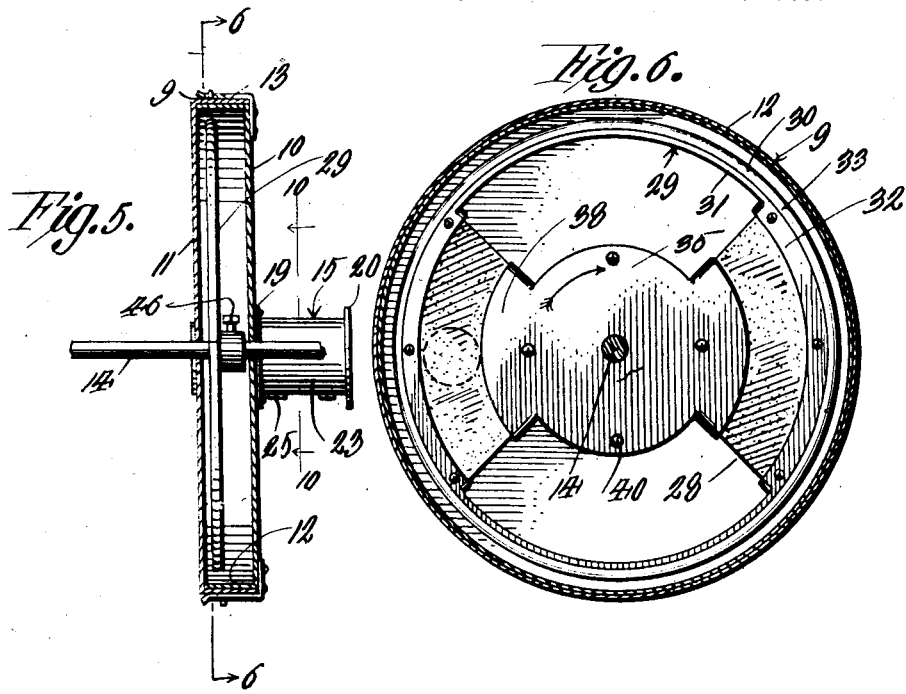
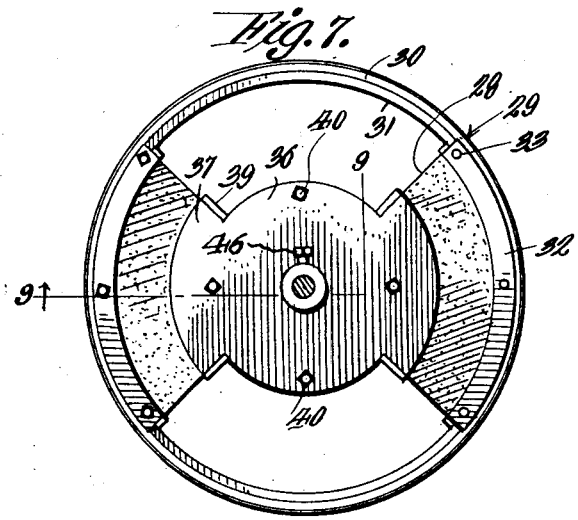
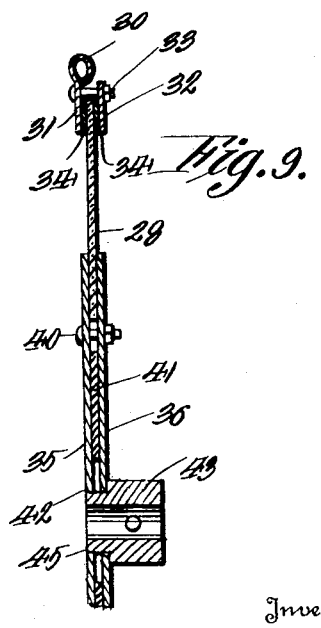
WITNESSES
Inventor
WILLIAM A. KEMP
By Richard B. Owen, Attorney

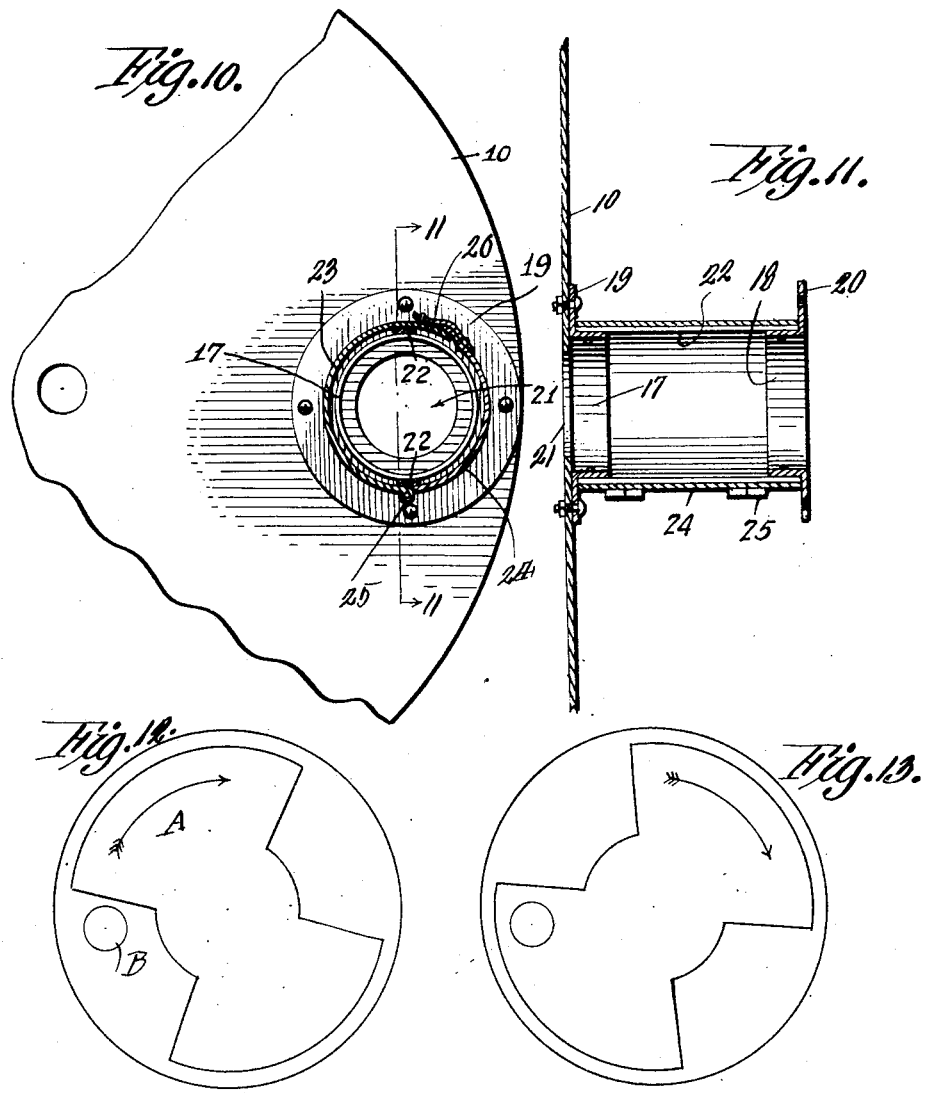

Jan. 1, 1929.  1,697,429
W. A. KEMP
SHUTTER MECHANISM FOR MOTION PICTURE MACHINES
Filed June 3, 1926   4 Sheets-Sheet 4
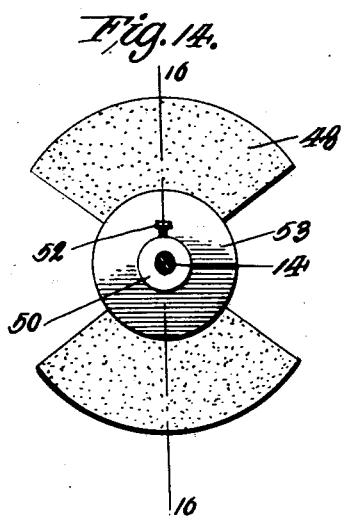
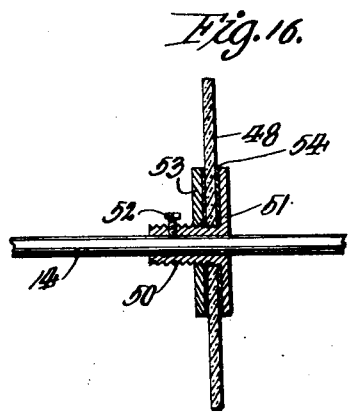
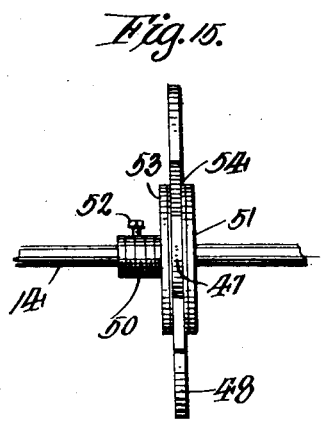
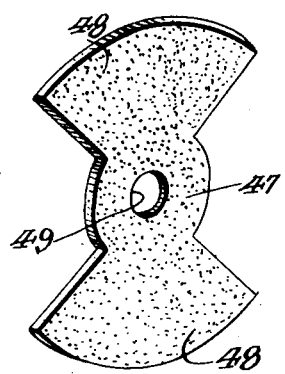
Inventor
WILLIAM A. KEMP
By Richard B. Owen, Attorney Patented Jan. 1, 1929.

1,697,429

UNITED STATES PATENT OFFICE.

WILLIAM A. KEMP, OF SHARON, PENNSYLVANIA.

SHUTTER MECHANISM FOR MOTION-PICTURE MACHINES.

Application filed June 3, 1926. Serial No. 113,501.

The present invention relates to improvements in shutter mechanisms used particularly in motion picture projectors and has for its principal object to provide a mechanism of this nature which will eliminate the flicker caused by the shutter mechanism now used. The flicker is caused by the continuous projection of shadows on the screen when the blind portions of the shutters cross the path of light.

Another important object of the invention is to eliminate the side lights which are thrown on the sides of a theater when the ordinary motion picture projector is used, these side lights being caused by the reflection of the light by the blind portions of the shutter mechanism.

With my improved shutter mechanism the images projected are clearer and more distinct because of the elimination of the flickers or continuous projecting of shadows on the screen. It is also possible to use practically any kind of screen and it is not obnoxious to sit close thereto as is the case where the ordinary shutter mechanism is used.

A still further very important object of the invention is to generally improve upon mechanisms of this nature and at the same time provide a device which is possessed of a very simple and efficient construction, one which is inexpensive to manufacture, reliable in operation, strong, durable, and well adapted to the purpose for which it is designed.

With the above and numerous other objects in view as will appear as the description progresses, the invention resides in certain novel features of construction, and in the combination and arrangement of parts as will be hereinafter more fully described and claimed.

In the drawing:

Figure 1 is a side elevation of the ordinary motion picture projector showing my shutter mechanism attached thereto, Figure 2 is a front elevation of the shutter mechanism in operative position, Figure 3 is a rear elevation thereof, Figure 4 is a perspective of the bracket utilized in mounting the shutter mechanism, Figure 5 is a vertical section taken through the shutter mechanism substantially on the line 5—5 of Figure 3 looking in the direction of the arrows, Figure 6 is a vertical section taken through the shutter mechanism substantially on the line 6—6 of Figure 5 looking in the direction of the arrows, Figure 7 is an elevation of the shutter mechanism, Figure 8 is a fragmentary detail perspective view showing a portion of the shutter, Figure 9 is a detail section through the shutter taken substantially on the line 9—9 of Figure 7, Figure 10 is a detail section taken through the lens housing forming a part of the shutter mechanism, said section being taken substantially on the line 10—10 of Figure 5 looking in the direction of the arrow, Figure 11 is a detail section taken substantially on the line 11—11 of Figure 10, Figures 12 and 13 are diagrammatic views showing the operation of the shutter mechanism, Figure 14 is a front elevational view of a modified form of shutter construction, Figure 15 is a side elevational view of the same, Figure 16 is a vertical sectional view taken substantially on line 16—16 of Figure 14, and Figure 17 is a perspective view of the shutter member.

Referring to the drawing in detail it will be seen that 1 designates generally the ordinary motion picture projector upon which I mount a bracket 2 which includes a body 3 having a flange 4 at one end and vertical extensions 6 and 7 at its other end. Angular members 8 are attached to the extensions 6 and are bolted or riveted or held in any other suitable manner to the housing of the projector 1. The shutter of my mechanism is housed within a casing 9 which consists of a back disk 10 and a front disk 11. These disks are provided with flanges 12 one adapted to overlie the other and suitable fastening clips 13 are utilized to hold the flanges together and thus hold the back and front plates in spaced relation to each other. These plates 10 and 11 are in the form of disks and provided with central registering openings through which the shutter shaft 14 extends. This shutter shaft 14 is operated from the projector 1 in the usual manner.

A cylindrical light housing 15 is attached at one end to the back plate 10 adjacent its edge and is attached to the housing of the projector 1 in any suitable manner so as to register with the openings therein through which the picture is projected. This confines the light being projected and its efficiency is greater than in the common mechanism where such a housing is not utilized. It is, of course, desirable that the lens of the projector be accessible and therefore I have constructed this housing so that it may readily be removed. This is accomplished by providing a skeleton consisting of collars 17 and 18 having flanges 19 and 20 respectively. The flange 19 is fixed to the rear plate of the casing 9 so as to register with the openings 21 therein while the collar 18 is disposed to register with the opening or lens of the motion picture projector 1. These collars are connected by two diametrically opposed ribs 22 which are riveted or otherwise securely fastened to the collars. The cylindrical housing proper is formed in two semi-cylindrical sections 23 and 24 as will be seen to advantage in Figure 10 and these sections are hinged together as at 25. The free edge of the section 24 is adapted to overlap the free edge of section 23 and suitable fastening means 26 is provided for holding these sections about the skeleton described above. By releasing the fastening means 26 it will be seen that the sections 23 and 24 may be readily removed and access may be had to the lens for adjustment purposes, cleaning purposes and otherwise.

The shutter proper is housed within the casing 9 and the preferred form consists of two ground blinds 28 and a skeleton which I have indicated generally by the numeral 29. This skeleton or frame 29 consists of a rim 30 preferably of tubular construction and provided with an inwardly extending annular flange 31. Segmental rim sections 32 are bolted as at 33 to the flange 31 and the strips of felt 34 are placed one on each side of the blinds 28 so that the nuts of the bolts 33 may be screwed tightly for holding the blinds in engagement with the rims as the rims 32 are drawn toward the flange 31. The hub structure of the skeleton or frame is formed by plates 35 and 36. The plate 36 has a disk body with segmental diametrically opposed extensions 37. The plate 35 is similarly constructed with extensions 38. The extensions 38 are provided at their ends with lips 39. The blinds 28 are receivable between the extensions 37 and 38 and the lips 39 are bent over the edges of the blinds and the ends of extensions 37. These plates are held together by bolts 40 and a spacing washer 41 in the form of a ring is disposed also between the plates adjacent their centers. Central openings 42 are provided in the plates 35 and 36 and a hub 43 having the reduced portion 45 receivable in the openings 42 is adapted to be disposed over the shaft 14 and to be keyed thereto by means of a set screw 46. The blinds 28 are constructed of ground glass which will allow the projections of light therethrough but will not allow the projection of images therethrough.

Referring with particularity to the modified form of shutter shown in Figures 14, 15, 16 and 17, it will be noted that the shutter is of unitary construction preferably formed of ground glass. It is considered advantageous that the glass shutter construction be manufactured of a variety known as "Pyrex" which is highly resistable to heat. This shutter is formed with a substantially semi-circular hub 47 having diametrically opposed blinds or blades 48. Of course, it is conceivable that this shutter structure may be readily formed to provide any number of blades when desirable. A central opening 49 is formed in the shutter for conection with a supporting structure.

This integral form of shutter is detachably secured in position on the shaft by a supporting structure embodying a longitudinal screw threaded sleeve 50 adapted for sliding movement on the shaft 14 provided at one end with a radial circular flange 51. The sleeve is provided with a screw threaded opening adapted to receive therein a set screw 52 by means of which the sleeve 50 is securely fastened in proper position on the shaft. A complementary flange 53 adapted to be disposed in opposed position to the flange 51 for association with the shutter, and provided with a central screw threaded opening is arranged for screw threaded connection with the sleeve 50. From this construction, it is obvious that the supporting structure may be assembled about the shutter so as to position the flanges 51 and 53 firmly against the sides of the hub 47. In order that the connection of the flanges may be accomplished with facility and without injurious effect upon the shutter I contemplate the provision of washers 54 having central openings and conforming in outer contour to the configuration of the shutter engaging flanges. These washers may be formed of leather or suitable material and may be conveniently replaced when necessary. This form of shutter structure provides a simplified arrangement which can be manufactured at a relatively low cost and will effectively operate in the projection of the pictures.

At present I am using frosted glass for the shutter structure and I find that fully ninety per cent of the light is projected on the screen when the shutter is in the position as indicated in Figure 13 that is as the pictures of the film are changing. This effectively eliminates the flicker or the casting of shadows upon the screen. The operation of the shutters, of course, can readily be understood by an inspection of the diagrammatic views in Figures 12 and 13. In the diagrammatic illustration the shutter proper is rotating in a clockwise direction and as the blinds A pass over the opening B the light is allowed to project therethrough but the image on the picture may not pass therethrough. As is well known the shutters now commonly used are usually constructed of metal and neither the light nor the image can pass through the blinds thereof and of course the shadows of the blind are passed upon the screen thus causing the flicker which is very objectionable and trying on the eyes of the audience. By allowing the light to be projected on the screen during the changes of the pictures of the film it will be seen that this flicker will be eliminated and that the pictures themselves will therefore be projected more clearly and more easily looked upon by the eyes of the audience taking away the strain and also making the pictures far more distinct.

It is thought that the construction, advantages, and operation of the invention will now by clearly understood by those skilled in this art.

While a preferred and a modified embodiment of my invention have been described in detail, it will be understood that I do not wish to be limited to the particular construction set forth, since various changes in the form, material, proportions, and arrangement of parts, and in the details of construction may be resorted to without departing from the spirit and scope of the invention as hereinafter claimed or sacrificing any of its advantages.

Having thus described my invention, what I claim as new is:

1. In combination, a motion picture projector, a shutter mechanism including a casing, a light housing connecting the projector with the casing, said housing including a skeleton, a shell about the skeleton formed in two semi-cylindrical sections hinged together, means for holding the shell about the skeleton, and a shutter rotatable within the casing operable by the projector.

2. A shutter for a motion picture projector including a skeleton comprising a rim having an inwardly extending flange, rim sections and bolts for holding the sections on the flange, a pair of diametrically opposed blinds disposed between the sections and flange being held therebetween by the bolts, a hub structure including a pair of plates having diametrically opposed extensions with one provided with lips engageable over the edges of the other extensions, said blinds being receivable between the extensions of the plates, means for drawing the plates to each other so as to engage their extensions with the blinds, and a hub proper engaged with the plates.

3. A shutter for a motion picture projector including a skeleton comprising a rim having an inwardly extending flange, rim sections, and bolts for holding the sections on the flange, a pair of diametrically opposed blinds disposed between the sections and being held therebetween by the bolts, a hub structure including a pair of plates having diametrically opposed extensions with one provided with lips engageable over the edges of the other extensions, said blinds being receivable between the extensions of the plates, bolts for drawing the plates to each other so as to engage their extensions with the blinds, a hub proper engaged with the plates, said blinds being formed of translucent glass.

4. A shutter for a motion picture projector including a skeleton comprising a rim having an inwardly extending flange, rim sections, and bolts for holding the sections on the flange, a pair of diametrically opposed blinds disposed between the sections and being held therebetween by the bolts, a hub structure including a pair of plates having diametrically opposed extensions with one provided with lips engageable over the edges of the other extensions, said blinds being receivable between the extensions of the plates, bolts for drawing the plates to each other so as to engage their extensions with the blinds, a hub proper engaged with the plates, said blinds being formed of translucent glass, and washers disposed between the rings and the flange of the rim.

5. A shutter for motion picture projection apparatus comprising a hub, substantially circular plates mounted upon the hub and having radial segmental extensions, translucent light-ray-transmitting panes of segmental form disposed at their inner ends between said extensions of the first mentioned plates, means securing the first mentioned plates together and effecting binding of their extensions against the inserted portions of said panes, an annular rim disposed concentric to and surrounding the first mentioned plates, the rim having inwardly projecting segmental extensions against which the outer peripheral portions of the said translucent light-ray-transmitting panes are disposed, and segmental strips disposed against said portions of said panes and coacting with the extensions of the rim to clamp said portions of the panes.

In testimony whereof I affix my signature.

WILLIAM A. KEMP.